(12) United States Patent
Herman et al.

(10) Patent No.: US 10,669,683 B2
(45) Date of Patent: Jun. 2, 2020

(54) FINE MESH FISH LARVAE PROTECTION SYSTEM FOR TRAVELING WATER SCREENS

(71) Applicant: Evoqua Water Technologies LLC, Pittsburgh, PA (US)

(72) Inventors: Bruce Herman, Schwenksville, PA (US); Stephen Thomas, Silverdale, PA (US); Sean McGaughran, Coopersburg, PA (US)

(73) Assignee: Evoqua Water Technologies Corp, Pittsburgh, PA (US)

(*) Notice: Subject to any disclaimer, the term of this patent is extended or adjusted under 35 U.S.C. 154(b) by 42 days.

(21) Appl. No.: 15/747,842

(22) PCT Filed: Jul. 29, 2016

(86) PCT No.: PCT/US2016/044616
§ 371 (c)(1),
(2) Date: Jan. 26, 2018

(87) PCT Pub. No.: WO2017/019928
PCT Pub. Date: Feb. 2, 2017

(65) Prior Publication Data
US 2018/0223491 A1 Aug. 9, 2018

Related U.S. Application Data

(60) Provisional application No. 62/198,853, filed on Jul. 30, 2015.

(51) Int. Cl.
*E02B 1/00* (2006.01)
*E02B 8/08* (2006.01)
*E02B 8/02* (2006.01)
*C02F 1/00* (2006.01)
*B01D 39/12* (2006.01)
*B01D 33/80* (2006.01)
*B01D 33/44* (2006.01)
*B01D 33/327* (2006.01)
*C02F 103/02* (2006.01)
*C02F 103/00* (2006.01)

(52) U.S. Cl.
CPC ............ *E02B 1/006* (2013.01); *B01D 33/327* (2013.01); *B01D 33/44* (2013.01); *B01D 33/804* (2013.01); *B01D 39/12* (2013.01); *C02F 1/004* (2013.01); *C02F 1/008* (2013.01); *E02B 8/023* (2013.01); *E02B 8/026* (2013.01); *E02B 8/085* (2013.01); *C02F 2103/007* (2013.01); *C02F 2103/023* (2013.01); *C02F 2303/16* (2013.01); *Y02A 40/60* (2018.01)

(58) Field of Classification Search
CPC . E02B 1/006; E02B 8/02; E02B 8/023; E02B 8/026
See application file for complete search history.

(56) References Cited

U.S. PATENT DOCUMENTS 2,804,209 A   8/1957   Carlton et al.
5,300,221 A   4/1994   Austevoll
(Continued)

*Primary Examiner* — Benjamin M Kurtz

(57) ABSTRACT

A traveling water screen comprises a basket having a frame including an upper portion, a lower portion, and side portions, a coarse screen secured to the frame, a fine screen overlay attachable to the coarse screen, and a bucket portion secured to a lower portion of the frame, comprising an inner wall surface, and at least one deflector secured to the inner wall surface.

28 Claims, 15 Drawing Sheets

(56) References Cited

U.S. PATENT DOCUMENTS

| | | | |
|---|---|---|---|
| 5,326,460 | A | 7/1994 | Cheesman et al. |
| 6,187,184 | B1 | 2/2001 | Reetz et al. |
| 2007/0210013 | A1 | 9/2007 | Bratten et al. |
| 2014/0299528 | A1 | 10/2014 | Doyle et al. |

FINE MESH FISH LARVAE PROTECTION SYSTEM FOR TRAVELING WATER SCREENS

CROSS-REFERENCE TO RELATED APPLICATIONS

This application is a U.S. national phase application, and claims the benefit of priority under 35 U.S.C. § 371, of International (PCT) Patent Application Ser. No. PCT/US2016/044616, titled FINE MESH FISH LARVAE PROTECTION SYSTEM FOR TRAVELING WATER SCREENS and filed on Jul. 29, 2016, which in turn claims priority under 35 U.S.C. § 119(e) to U.S. Provisional Patent Application Ser. No. 62/198,853, titled FINE MESH FISH LARVAE PROTECTION SYSTEM FOR TRAVELING WATER SCREENS, and filed on Jul. 30, 2015, the contents of which are incorporated herein by reference in their entireties.

BACKGROUND

The invention relates to traveling water screens for screening debris, fish, and fish larvae from water.

SUMMARY

In accordance with an aspect of the present invention, there is provided a traveling water screen for filtering fish larvae from a water stream.

In some embodiments, a traveling water screen may comprise a basket comprising a frame having an upper portion, a lower portion, and side portions, a coarse screen secured to the frame, a fine screen overlay attachable to the coarse screen, and a fine bucket portion secured to a lower portion of the frame, comprising an inner wall surface, and at least one deflector secured to the inner wall surface.

In some aspects, the fine screen overlay is attachable directly to the coarse screen.

In some aspects, the inner wall surface extends below the lower portion of the frame and creates a volumetric space. In some aspects, the inner wall surface is concave.

In some aspects, the bucket extends below and across the entire lower portion.

In some aspects, the traveling water screen comprises at least two deflectors. In some aspects, at least one of the deflectors is wedge-shaped. In some embodiments, the deflectors are positioned on opposite side portions, each deflector having a bevel directed at the center of the bucket.

In some aspects, the fine screen overlay has an opening size of about 6 $mm^2$ or less.

In some aspects, the traveling water screen may comprise a plurality of baskets. In some aspects, each of the plurality of baskets is attached to an endless chain and is configured to move about a predetermined path. In some aspects, the movement of the plurality of baskets is controlled by a movement control system. In some aspects, the traveling water screen further comprises a spray head assembly in fluid communication with a source of water and directed at the baskets. In some aspects, the spray head assembly comprises at least two spray heads.

In some aspects, the at least one spray head is directed to a front portion of the basket. In some aspects, the spray head is configured to direct organisms to the center of the basket. In some aspects, the at least one spray head is directed at a rear portion of the basket. In some aspects, the spray head is configured to remove debris from the basket.

In some aspects, the at least two spray heads have different pressures. In some aspects, the flow rates of the spray heads are independently adjustable.

In some aspects, the traveling water screen further comprises a spray head assembly control system. In some aspects, the spray head assembly control system comprises at least one sensor. In some aspects, the at least one sensor provides an input signal to a controller, which provides an output signal to a pump fluidly connected to a source of water. In some aspects, the input signal is based on a system variable. In some aspects, the system variable comprises at least one of a system water demand, a pressure drop, a flowrate, temperature a water level, or a temporal season. In some aspects, the controller is further connected to a timer.

In some embodiments, a traveling water screen comprises a plurality of baskets, each basket comprising a frame, a coarse screen secured to the frame, a fine screen overlay attachable to the coarse screen, a bucket secured to a lower portion of the frame, and a spray head assembly comprising a first spray head positioned to direct organisms to a center of the bucket.

In some aspects, the first spray head is directed at a front portion of the bucket.

In some aspects, the traveling water screen further comprises a second spray head positioned to remove organisms from a basket.

In some aspects, the second spray head is directed at a rear portion of the basket.

In some aspects, the fine screen overlay has an opening size of about 6 $mm^2$ or less.

In some aspects, the plurality of baskets is positioned to move about a predetermined path.

In some aspects, the traveling water screen further comprises a control system. In some aspects, the control system comprises at least one sensor. In some aspects, the at least one sensor provides an input signal to a controller, which provides an output signal to a source of water. In some aspects, the input signal is based on a system variable. In some embodiments, the controller is further connected to a timer.

In some embodiments, a power plant cooling water system comprises an inlet for introducing a cooling water intake stream from a water source, and a traveling water screen positioned upstream of the inlet and the system, the traveling water screen comprising a basket comprising a frame, a coarse screen attached to the frame, a fine screen overlay attached to the coarse screen, and a bucket portion secured to a lower portion of the frame comprising an inner surface, and at least one deflector secured to the inner surface.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawings. In the drawings.

DETAILED DESCRIPTION

Figure 1A:
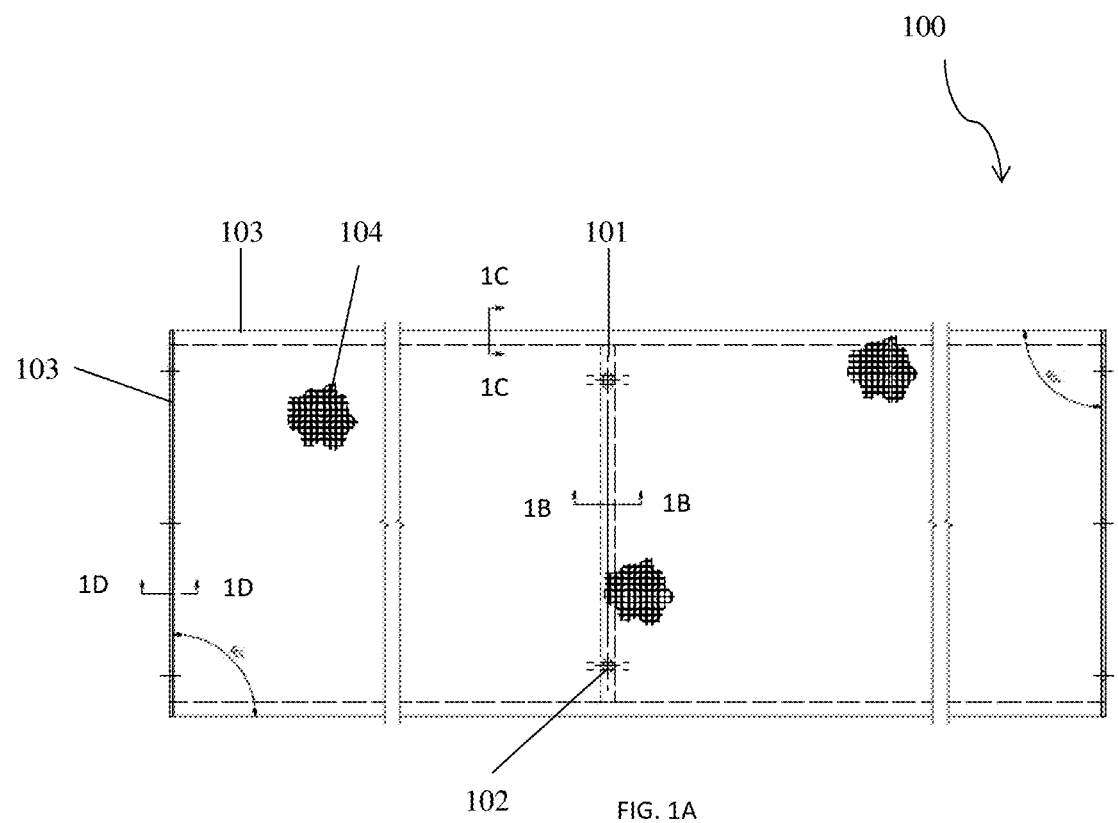
FIG. 1A is a schematic diagram of a fine mesh screen in accordance with one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Traveling water screens are used to screen organisms from large volumes of water. Organisms may include fish, debris, larvae, plant life, and various smaller organisms. For example, a traveling water screen may be used upstream of an industrial facility or power plant that requires a large volume of water, for example, cooling water. Ordinarily, water for this purpose is taken from a river or lake through an inlet water channel. Organisms may enter with the water flowing into the channel, and must be screened out of the water to prevent clogging of the condenser tubes, and in the case of smaller organisms and fish, to prevent them from being killed by heat and impingement on the condenser tubes and other parts of the cooling system.

A recent United States Environmental Protection Agency Rule 316(b) (National Pollutant Discharge Elimination System, 79 Fed. Reg. 158, 48300 (Aug. 15, 2014)) requires that power plants that use over 125 MGD (millions of gallons per day) of cooling water must also prevent organisms such as small fish, larvae, and fish, and eggs from being entrained in inlet water channels. This rule requires an intake screening system to prevent the small organisms, such as small fish, eggs, and larvae, from being withdrawn from a body of water through to the plant cooling system.

A typical traveling water screen includes a coarse mesh screen for filtering debris and fish from the intake water stream. Typically, fine mesh screens have not been used because they can clog prematurely with various debris, and can increase the head-loss pressure into the cooling system. Additionally, for example, fish larvae are typically present in certain bodies of water on a seasonal basis, and a permanent fine mesh screen may not be necessary. For example, fish larvae may only be present in a body of water for a period of one month during the spring season. Accordingly, most intake screens comprise coarse screens having mesh openings of greater than 6 mm$^2$. However, coarse screens having mesh openings of greater than 6 mm$^2$ will not prevent fish larvae and other small organisms from pumping through. There is a need, therefore, for an apparatus that can be used to prevent small fish larvae and eggs from passing through to the water intake when in season, and which can be removed during select period of operation to avoid clogging and other issues associated with using fine mesh screens.

In some embodiments, a traveling water screen comprising a fine mesh screen may be used. The traveling water screen may have an upright frame having a pair of spaced vertical support members. The support members may be mounted adjacent the opposed sides of the water inlet channel, such that water flowing through the channel cannot flow around the sides of the water screen. The frame may include a bucket portion adjacent the bottom of the channel and a head portion anchored in a horizontal shelf above the water in the channel. A foot shaft or roll-around track may be supported for rotation at the bucket portion. A head shaft may be supported for rotation at the head portion of the frame, and a drive motor may be connected to the head shaft. A pair of endless chains may be trained around sprockets mounted on the head and foot shafts. A plurality of screen baskets may be mounted on the chains and arranged in a continuous train for movement about a circuitous path defined around the head and foot shafts. Adjacent baskets may be mounted in a close, edge-to-edge relationship. Small gaps may exist between the baskets to provide clearance as the baskets travel around the head and foot shafts. On the upstream side of the frame, the train of baskets may move upwardly from the foot shaft toward the head shaft, thereby forming a substantially continuous upwardly moving screen on the upstream side of the frame.

In one embodiment, a fine mesh screen may be attached directly to and over the coarse mesh screen. One fine mesh screen may be sized and configured to cover one coarse mesh screen. In some embodiments, two fine mesh screens may be size and configured to cover one coarse mesh screen. The fine mesh screen may have mesh openings sized to prevent small organisms from entering the water intake, for example, for a power plant cooling system. In some embodiments, the fine mesh screen may have mesh openings sized less than about 6 mm². In some embodiments, the fine mesh screen may have mesh openings sized less than about 5 mm². In some embodiments, the fine mesh screen may have mesh openings sized less than about 4 mm². In some embodiments, the fine mesh screen may have mesh openings sized less than about 3 mm². In some embodiments, the fine mesh screen may have mesh openings sized less than about 2 mm². In some embodiments, the fine mesh screen may have mesh openings sized less than about 1 mm². The coarse mesh screen may comprise a mating feature, for example, threaded inserts, which may be sized and configured to mate with an attachment and secure the fine mesh screen. The fine mesh screen may be secured with most any common means, for example, snaps, hooks, magnets, fasteners, or bolts, provided the attachment can withstand normal operation of the traveling water screen.

The fine mesh screen may be a part of a fine mesh panel. The panel may comprise an outer frame. In some embodiments, the panel may comprise a rigid stainless steel outer frame. The panel frame may be shaped or formed to securely attach the panel to the outer frame. In some embodiments, the panel frame may be angled at a predetermined degree to secure the panel. For example, the panel may be angled at 90°. Attachment devices or holes may be added to each end to aid in securing the panel. A sealing material, such as a gasket, may be installed in the top and bottom ends of the frame to seal any gaps once the panel is installed on the basket. The fine mesh screen may also be stretched across the frame at a predetermined tension to allow the fine mesh to rest on the coarse mesh screen of the basket.

The fine mesh may be attached to the frame by any means that can withstand operating conditions of a traveling water screen. In one embodiment, the fine mesh may be attached to the frame by use of an epoxy, which may allow for fewer parts and mechanical fittings, such as retainer bars or fasteners. These parts may interfere with larvae contacting or moving on the fine mesh screen.

The fine mesh panel may be sized to fit securely over the coarse mesh. The fine mesh panel may be any size necessary to adequately cover a cooling water inlet. Most typically, the fine mesh screen may be between about 1 foot and 6 feet tall. In some embodiments, the fine mesh screen may be between about 2 feet and 4 feet tall. In some embodiments, the fine mesh screen may be between about 2 feet and 3 feet tall. For example, the fine mesh screen may be about 2 feet tall.

The fine mesh screen may be sized to fit over a coarse mesh screen. The coarse mesh screen may be about 2 feet to about 14 feet wide. In some embodiments, the coarse mesh screen may be between about 2 feet and about 10 feet wide. In some embodiments, the coarse mesh screen may be between about 2 feet and about 6 feet wide. In some embodiments, the coarse mesh screen may be between about 3 feet and 5 feet wide. In some embodiments, one fine mesh screen may be attached over a coarse mesh screen having a width of between about 2 feet and about 10 feet. In some embodiments, two fine mesh screens may be attached over a coarse mesh screen having a width of greater than 10 feet.

The fine mesh screen may have openings of about 6 mm² or less to prevent small organisms from entering a water inlet of, for example, a power plant cooling system. In some embodiments, the fine mesh screen may be comprised of a wire material. In some embodiments, the mesh may be comprised of a non-metallic wire. In other embodiments, the mesh may be comprised of a metallic wire, for example, a stainless steel wire.

The coarse mesh wire may be comprised of any material capable of withstanding normal operation of traveling water screens. The coarse mesh screen may be comprised of a thicker metallic wire metallic wire for supporting for the fine mesh screen, as well as intake water pressure. In some embodiments, the coarse mesh wire may be stainless steel. The wire may further be sized to provide strength and support for the fine mesh screen. In some embodiments, the coarse mesh screen wire may have a diameter of about 0.04 in. to about 0.105 in. In some embodiments, the coarse mesh screen wire may have a diameter of about 0.06 in. Attaching the fine mesh screen directly over the coarse mesh screen may reduce replacement time, since the coarse mesh screen is affixed to the frame, and is not typically removed.

In some embodiments, the traveling water screen may comprise a basket having a bucket. The bucket may comprise an inner wall surface. In some embodiments, the inner wall surface extends below a lower portion of the basket frame and creates a volumetric space. In some embodiments, the bucket may extend below and across the lower portion. The inner wall surface may be shaped and configured to hold organisms before release. In some embodiments, the inner wall surface may be concave.

The bucket may further comprise a deflector. The deflector may be secured to the inner wall of the bucket. The deflector may be positioned and secured in the bucket so as to divert fish, larvae, and debris to the center of the bucket. The deflector may be comprised of any material capable of withstanding the operating conditions of a traveling water screen. For example, the deflector may be a non-metallic material. In some embodiments, the deflector is comprised of a smooth material.

In some embodiments, the deflector is angled. The deflector may be angled at any angle which diverts organisms to the center of the bucket. In some embodiments, the deflector may be angled at between about 0° and about 90°. In some embodiments, the deflector may be angled at between about 10° and about 60°. In some embodiments, the deflector may be angled about between about 15° and about 45°. In some embodiments, the deflector may be angled at about 30°. In some embodiments, the deflector may be wedge-shaped. In some embodiments, the deflector may be evenly tapered. The deflector may be secured to the bucket such that its beveled edge is facing the center of the bucket. The deflector may be gradually tapered toward the center of the bucket.

In some embodiments, the deflector may be between about 6 in. and about 10 in. long. For example, the deflector may be between about 8 in. and about 9 in. long. In some embodiments, the deflector may be about 8.78 in. long.

In some embodiments, the deflector may be between about 2 in. and about 6 in. wide at its widest point. For example, the deflector may be between about 4 in. and about 5 in. wide at its widest point. In some embodiments, the deflector may be about 4.34 in. wide at its widest point.

In some embodiments, the deflector may be between about 1 in. and about 3 in. high. For example, the deflector may be between about 1.5 in. and about 2.5 in. high. In some embodiments, the deflector may be about 2.03 in. high.

The deflector may be secured to an inner wall of the bucket. In some embodiments, the deflector is secured to a side portion of the bucket. In some embodiments, more than one deflector is secured to the inner wall of the bucket. For example, two deflectors may be attached to the inner wall of the bucket. Each of the two deflectors may have the same dimensions and the same taper. The two deflectors may be positioned on opposing side portions of the bucket. The beveled edge of each deflector may be directed to the center of the bucket to direct fish to the center of the bucket.

The traveling water screen may comprise a plurality of baskets. Each basket may comprise a frame having an upper portion, a lower portion, and side portions. A coarse screen may be secured to the frame. A fine mesh screen overlay may be attachable to the basket frame over the coarse screen. In some embodiments, the fine mesh screen may be attachable directly to the coarse screen. In some embodiments, a bucket portion may be secured to a lower portion of the frame comprising an inner wall surface. At least one deflector may be secured to the inner wall surface.

Each of the plurality of baskets may be connected by any means capable of moving the baskets around a predetermined path, for example, a circuitous path. In some embodiments, the plurality of baskets may be connected by a chain trained around a sprocket. The sprocket and chain may be connected by a drive unit connected to the headshaft. The drive unit may be further connected to a movement control system configured to control the movement of the plurality of baskets. For example, the movement control system may adjust the speed of the plurality of baskets based on a sensed system variable. A sensor positioned anywhere on the traveling water screen system may transmit an input signal to the controller, which may then transmit an output signal to, for example, the drive unit. In some embodiments, the system variable may be at least one of a water demand, pressure, temperature, flowrate, water levels, or temporal season. The control may further be connected to a timer.

In some embodiments, the traveling water screen may comprise a spray assembly. In one embodiment, a spray assembly may comprise an internal spray header directed at a rear portion of a basket during operation. For example, an internal spray header may be directed at a rear portion of a coarse mesh screen. In some embodiments, the spray assembly may comprise a dual internal spray header. The internal spray header may be configured to remove small organisms from the basket. The internal spray header may spray water constantly or may spray water intermittently. For example, the internal spray header may spray water at a portion of each of the plurality of baskets as the plurality of baskets moves about a predetermined path.

The spray assembly may further comprise an external spray header. The external spray header may be directed at a front portion of a basket. For example, the external spray header may be directed at a front portion of a bucket. The external spray header may be located about 1 ft. 1⅜ in. from the vertical axis of a headshaft, and about 2 ft. 5⅛ in. to 2 ft. 11 in. above the horizontal axis of the headshaft. The external spray header may spray water at any angle capable of directing organisms to the center of the bucket. For example, the spray header may spray at an angle of between about 0° and about 30°. In some embodiments, the external spray header may spray water at an angle of between about 5° and about 20°. In some embodiments, the external spray header may spray water at an angle of about 16° to a screen in the traveling water screen. The pressure of the external spray header may be lower than the pressure of the internal spray header. In some embodiments, the internal fish spray header may have a pressure of between about 10 PSI and about 15 PSI. For example, the internal fish spray header may have a pressure of about 15 PSI. In some embodiments, the external auxiliary spray header may have a pressure of about 5 PSI to about 10 PSI. For example, the internal fish spray header may have a pressure of about 7 PSI.

The external spray header may spray water constantly or may spray water intermittently. For example, the internal external spray header may spray water at a portion of each of the plurality of buckets as the plurality of baskets moves about a predetermined path.

The angle of each spray header may be adjusted. For example, the angle of each spray header may be independently adjusted. In some embodiments, individual nozzles within the spray headers may be independently adjusted. The flow rate of each spray header, or of each nozzle, may also be individually adjusted. The angle and/or flow rate of each spray header and/or each nozzle may be controlled by a controller. The controller may be connected to a sensor positioned anywhere in the traveling water system. The sensor may transmit an input signal, based on a system variable, to the controller, which may then transmit an output signal to a water pump or valve. The water pump or valve may be fluidly connected to a source of water. In some embodiments, the source of water may be filtered water. In some embodiments, the variables may be at least one of a system water demand, pressure, temperature, flowrate, water levels, or temporal season.

FIG. 1A depicts one embodiment of a fine mesh overlay panel 100. Fine mesh overlay panel 100 comprises a fine mesh panel frame 103 having a center brace 101. In some embodiments, when the fine mesh panel frame 103 is less than 4 feet wide, there is no center brace 101. Center brace 101 may be positioned in the approximate center of fine mesh panel frame 103. Fine mesh panel frame 103 may be approximately rectangular, and may comprise at least two vertical and at least two horizontal support members. Center brace 101 may be sized and configured to provide support for the frame, for example, to prevent the frame from buckling under the pressure of the intake water. Center brace 101 may comprise slots or holes 102 sized and configured to allow for the passage of attachment means to attach the fine mesh overlay panel to a basket frame center strut. For example, slots or holes 102 may be sized and configured to allow for the passage of a bolt, fastener, magnet, or any other common attachment means capable of withstanding the normal operation of a traveling water screen.

A fine mesh 104 is stretched over, and attached to, fine mesh frame 103. In some embodiments, fine mesh 104 may be a stainless steel wire. The diameter of the fine mesh wire is based on the square opening of the wire mesh. In some embodiments, the diameter may be between about 0.0065 in. and about 0.025 in. The fine mesh may be sized to prevent small organisms and debris from passing through. The fine mesh may have a mesh opening size of between about 0.5 mm$^2$ and about 2.0 mm$^2$. In some embodiments, the fine mesh may have a mesh opening size of about 0.5 mm$^2$. In some embodiments, the fine mesh may have a mesh opening size of about 1.0 mm$^2$. In some embodiments, the fine mesh may have a mesh opening size of about 2.0 mm$^2$. The fine mesh 104 may be sized and configured to cover at least a portion of a coarse mesh screen. In some embodiments, the coarse mesh screen may be about 2 feet tall and about 6 ft. 6 in. wide.

Figure 1B:
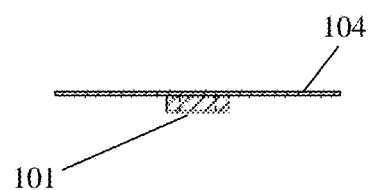
FIG. 1B is an expanded view of a portion of a fine mesh screen taken along section line 1B-1B of FIG. 1A in accordance with one embodiment of the invention.

FIG. 1B shows an expanded view of a fine mesh screen along section line 1B-1B of FIG. 1A. In this embodiment, fine mesh 104 is stretched over, and attached to, center brace 101 of fine mesh frame 103. Fine mesh 104 may be secured to center brace 101 by any common attachment means suitable for water applications. In some embodiments, fine mesh 104 may be attached to center brace 101 using any attachment means capable of withstanding the normal operating conditions of a traveling water screen. For example, the fine mesh 104 may be attached to center brace 101 using an epoxy.

Figure 1C:
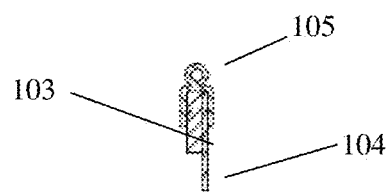
FIG. 1C is an expanded side view of a portion of a rubber seal taken along section line 1C-1C of FIG. 1A, in accordance with one embodiment of the invention.

FIG. 1C shows an expanded side view of section line 1C-1C of FIG. 1A. In this embodiment, fine mesh 104 is stretched over, and attached to, center brace 101 of frame mesh frame 103. A seal 105 may be attached to at least a portion of the center frame. The seal may be made of any flexible material suitable for sealing a gap between baskets in a traveling fish screen. For example, the seal may be made of any material capable of withstanding the conditions of the normal operation of a traveling water screen. For example, seal 105 may be a gasket. In one embodiment, the seal 105 is a rubber seal. The seal 105 may be sized and configured to seal any gaps between basket frame and fine mesh panel 100.

Figure 1D:
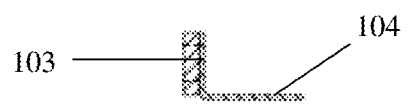
FIG. 1D is an expanded side view of a portion of a fine mesh screen bent at a 90° angle taken along section line 1D-1D of FIG. 1A, in accordance with one embodiment of the invention.

In some embodiments, the fine mesh 104 may be bent in order to attach to a fine mesh panel frame 103 (FIG. 1D). In this embodiment, fine mesh 104 is bent at an approximately 90° angle. The bent fine mesh 104 may be attached to fine mesh panel frame 103 by any common means capable of withstanding the conditions of the normal operating conditions of a traveling water screen. For example, the fine mesh 104 may be attached to the fine mesh panel frame 103 by an epoxy.

Figure 2:
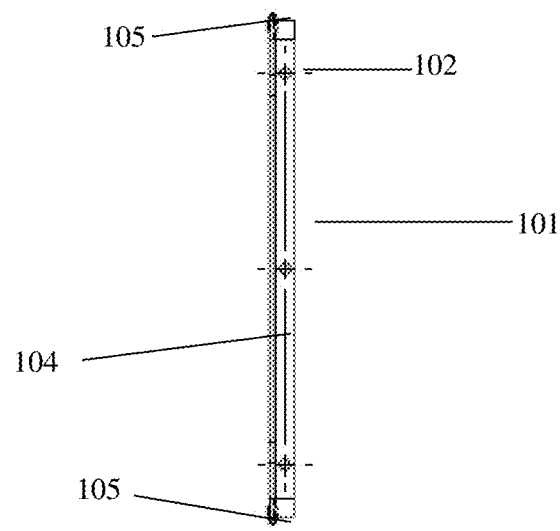
FIG. 2 is a side view of a water screen basket assembly in accordance with one embodiment of the invention.

In some embodiments, a seal 105 may be attached to both of the top end and the bottom portions of the panel frame 103 having a fine mesh 104 attached (FIG. 2). The seal 105 may be made of any flexible material suitable for sealing a gap between basket frame and fine mesh panel 100. For example, the seal may be made of any material capable of withstanding the normal operating conditions of a traveling water screen. In one embodiment, the seal 105 is a gasket. In one embodiment, the seal 105 is a rubber seal. The seal 105 may be sized and configured to seal any gaps between basket frame and fine mesh panel 100. Center brace 101 may have holes or slots 102 sized and configured to allow for the passage of attachment means. For example, holes or slots 102 may be sized and configured to allow for the passage of a bolt, fastener, magnet, or any other common attachment means capable of withstanding the normal operating conditions of a traveling water screen.

Figure 3A:
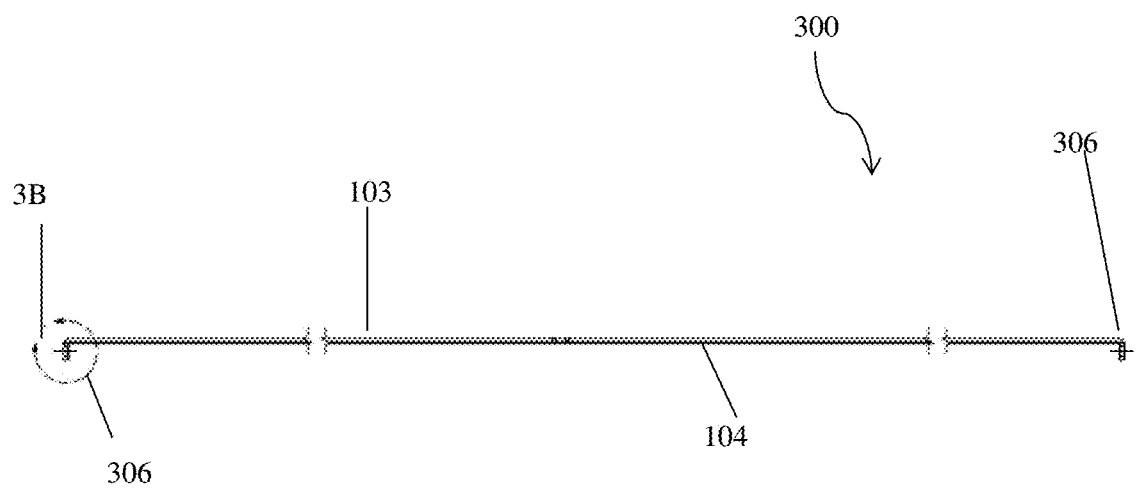
FIG. 3A is a partially broken side view of an assembly in accordance with one embodiment of the invention.
Figure 3B:
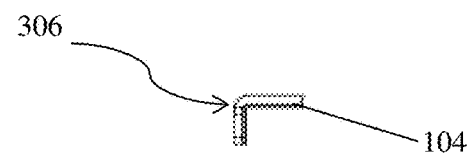
FIG. 3B is an expanded side view of a fine mesh screen bent at a 90° angle as shown in FIG. 3A, in accordance with one embodiment of the invention.

A bent fine mesh panel 300 may be attachable to a coarse mesh for screening small organisms and debris from an intake water stream. As shown in FIG. 3A, bent fine mesh panel including a fine mesh 104 is attached to fine mesh panel frame 103. The fine mesh frame is bent at a 90° angle on both end portions 306. The bent end portions 306 of fine mesh frame 103 may allow for attachment of a fine mesh overlay panel to a basket assembly having a coarse mesh screen. An expanded view of a bent end portion 306, having a fine mesh 104 attached, is shown in FIG. 3B.

Figure 4A:
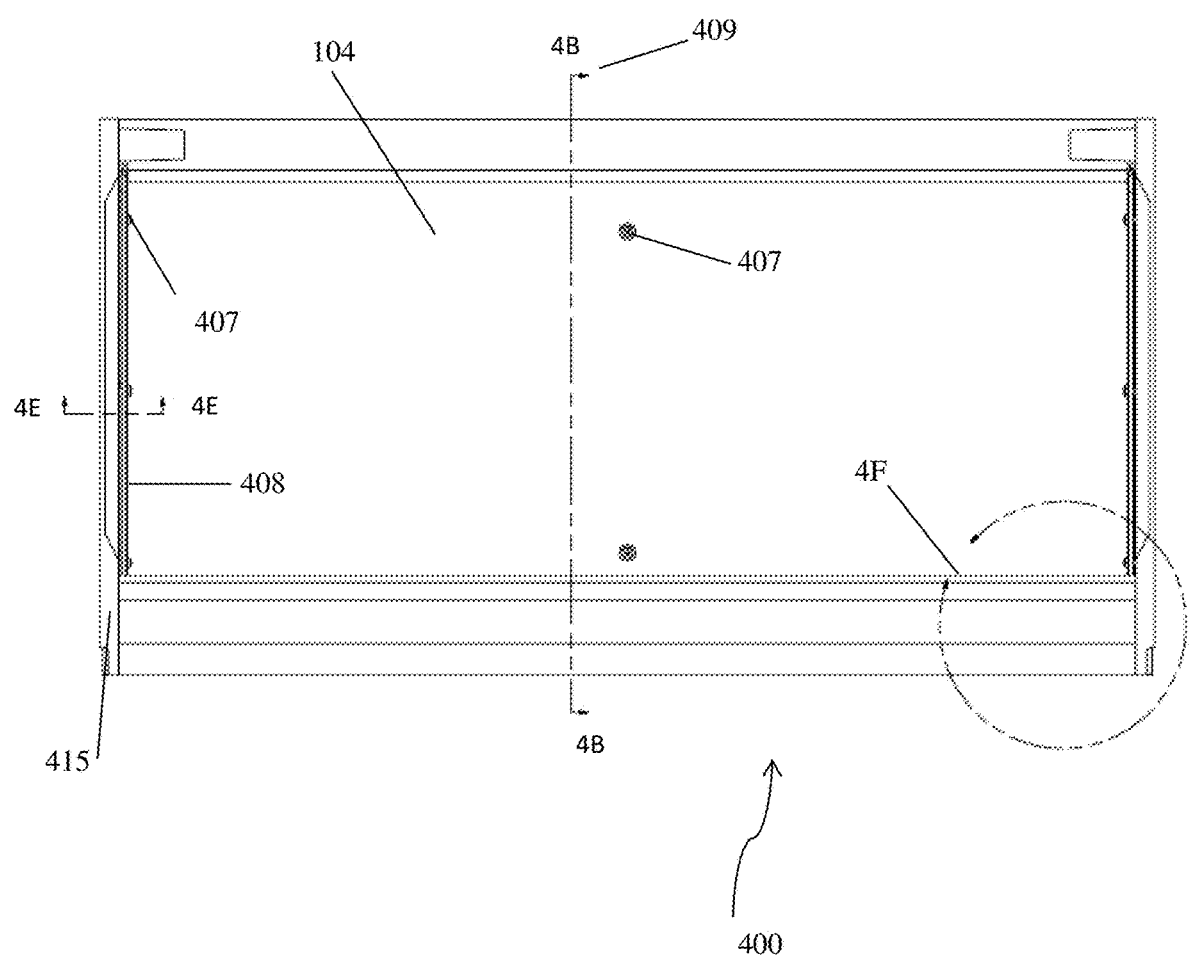
FIG. 4A is a front schematic of a basket assembly taken along section line 4B-4B of FIG. 4A in accordance with one embodiment of the invention.

A basket 400 with a fine mesh overlay panel is depicted in FIG. 4A. A fine mesh overlay panel 100 comprising fine mesh 104 is attached to a basket frame 415. In some embodiments, the fine mesh overlay panel 100 is attached to the basket frame by attachment means 407 to basket endplate 408. The attachment means 407 may be any common mechanical attachment means capable of withstanding the normal operating conditions of a traveling water screen. In some embodiments, attachment means 407 may comprise a bolt. In some embodiments, attachment means 407 may be sized and configured to pass through holes/slots 102 of fine mesh overlay panel 100.

Figure 4B:
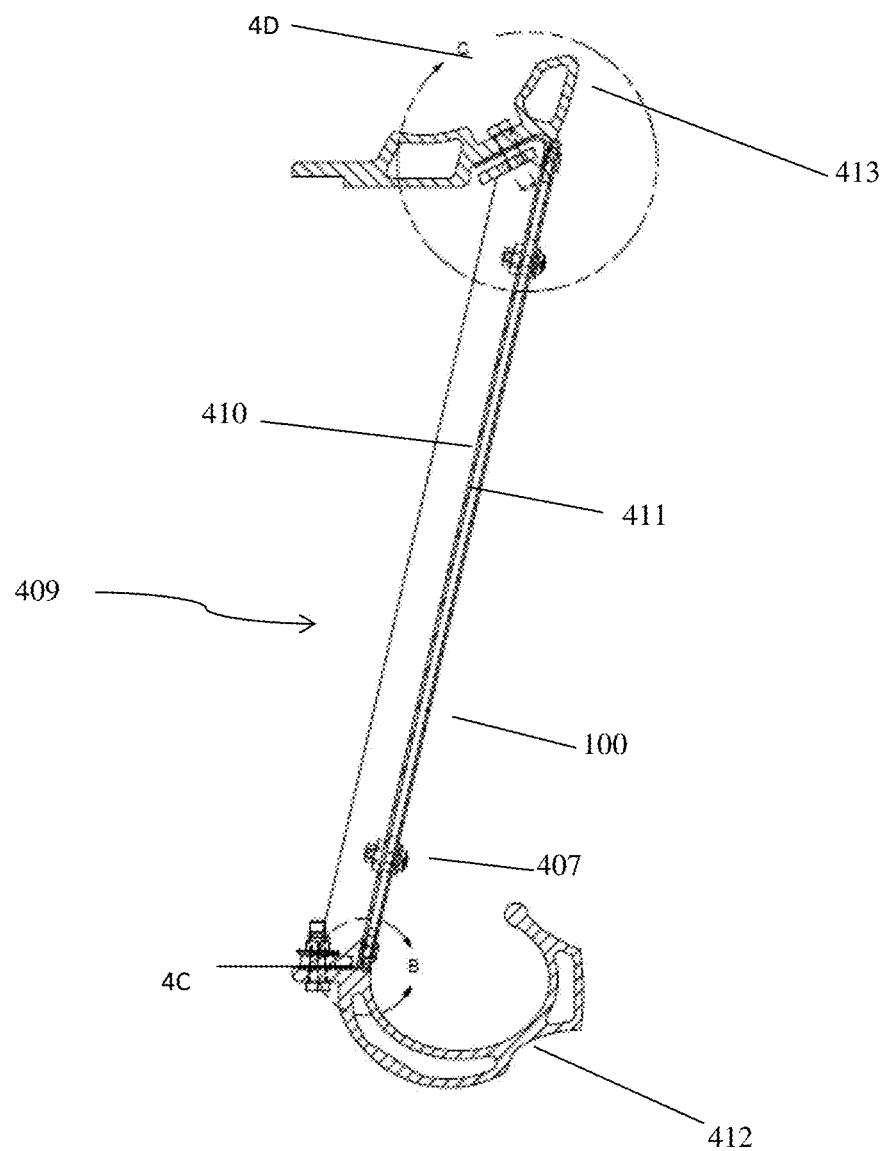
FIG. 4B is an expanded side view of a portion of a traveling water screen basket taken along section line 4B-4B in accordance with one embodiment of the invention.

FIG. 4B shows basket 409, which is positioned along line 4B-4B. Basket 409 comprises basket frame center strut 410. A basket coarse mesh 411 is disposed on basket frame center strut 410 of basket frame 413. The basket coarse mesh may comprise metallic wire to provide support for the fine mesh. In some embodiments, the wire may be stainless steel. The wire may further be sized to provide strength and support for the fine mesh. In some embodiments, the coarse mesh screen wire may have a diameter of about 0.06 in to about 0.105 in.

Fine mesh overlay panel 100 may attached to the basket coarse mesh 411. In some embodiments, the fine mesh overlay panel 100 is attached to the basket coarse mesh 411 by way of attachment means 407. Attachment means 407 may be any commonly available mechanical attachment means capable of withstanding the normal operating conditions of a traveling water screen. For example, the means may be snaps, hooks, magnets, fasteners, or bolts. In some embodiments, attachment means 407 may be sized and configured to pass through slots 102 of fine mesh overlay panel 100 to attach fine mesh overlay panel 100 to the basket frame center strut 410.

Figure 4C:
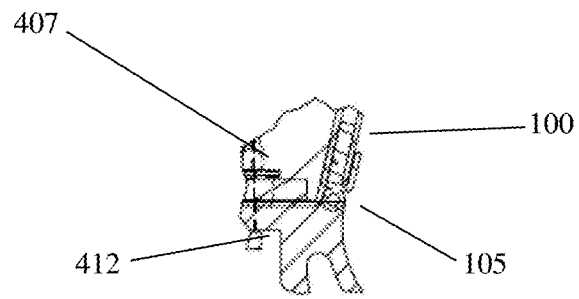
FIG. 4C is an expanded side view of a portion of a bucket of section 4C of FIG. 4A in accordance with one embodiment of the invention.

At the bottom end of basket frame center strut 410 may be positioned a bucket 412. Bucket 412 may be made from pultruding fiberglass and resin through a die in the shape of a bucket. Bucket 412 may be sized and configured to hold and transport fish and large debris from an intake stream. For example, bucket 412 may be enclosed on its sides to hold fish, larvae, and debris. In some embodiments, as shown in FIG. 4C, bucket 412 may be secured to basket frame center strut 410 by attachment means 407. Attachment means 407 may be any commonly available mechanical attachment means capable of withstanding the normal operating conditions of a traveling water screen. For example, the means may be snaps, hooks, magnets, fasteners, or bolts.

A flexible material may seal any space between the fine mesh overlay panel 100 and the bucket 412. The seal may be made of any material suitable for sealing a gap between baskets in a traveling fish screen. For example, the seal may be made of any material capable of withstanding the conditions of a water application. In one embodiment, the seal 105 is a rubber seal. In some embodiments, the seal 105 is a gasket. The seal 105 may be sized and configured to seal any gaps between basket frame and fine mesh panel 100.

Figure 4D:
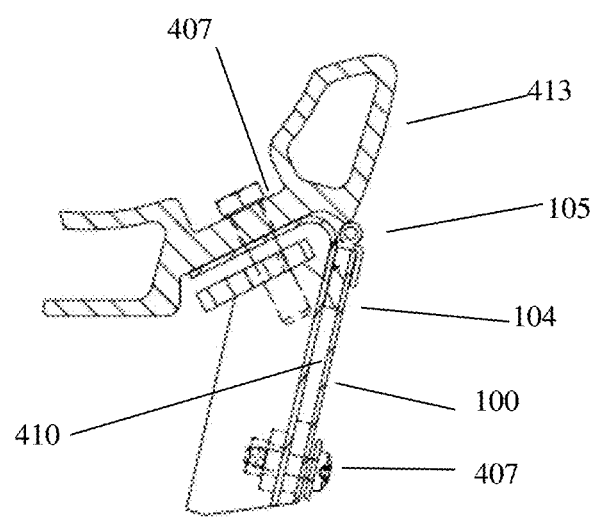
FIG. 4D is an expanded side view of a portion of a basket frame of section 4D of FIG. 4B in accordance with one embodiment of the invention.

Referring now to FIG. 4D, a basket frame 413 may be secured to the top end of basket frame center strut 410. In some embodiments, basket frame 413 may be secured to basket frame center strut 410 using attachment means 407. Attachment means 407 may be any commonly available mechanical attachment means capable of withstanding the normal operating conditions of a traveling water screen. For example, the means may be snaps, hooks, magnets, fasteners, or bolts. A seal 105 may seal any space between the fine mesh overlay panel 100 and the basket frame 413.

Figure 4E:
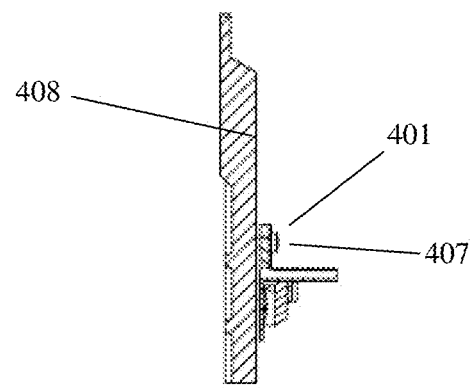
FIG. 4E is an expanded side view of a portion of a fine mesh secured to an endplate taken along section line 4E-4E of FIG. 4A, in accordance with one embodiment of the invention.

In some embodiments, the fine mesh 401 may be secured to the endplate 408 by attachment means 407 (FIG. 4E). Attachment means 407 may be any commonly available mechanical attachment means capable of withstanding normal operating conditions of a traveling water screen. For example, the means may be snaps, hooks, magnets, fasteners, or bolts.

Figure 4F:
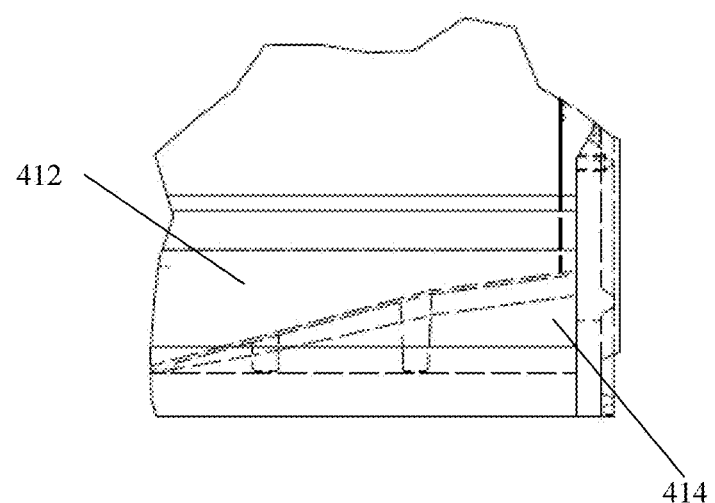
FIG. 4F is an expanded side views of a portion of a bucket of section 4F of FIG. 4B in accordance with one embodiment of the invention.
Figure 5A:
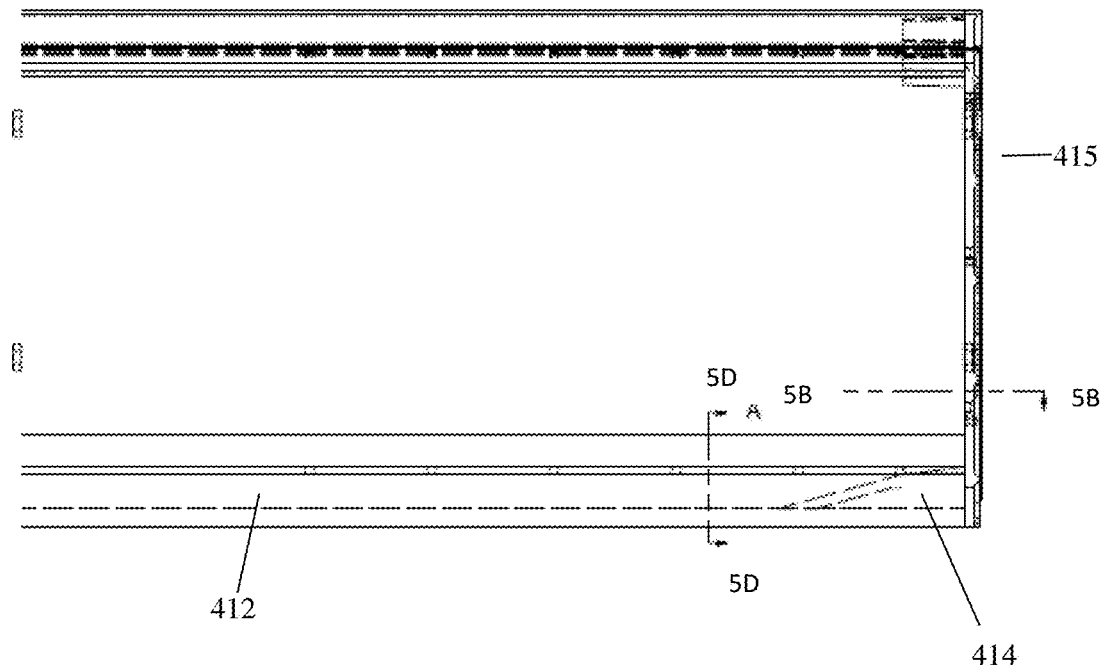
FIG. 5A is an overhead view of a portion of a basket in accordance with one embodiment of the invention.
Figure 5B:
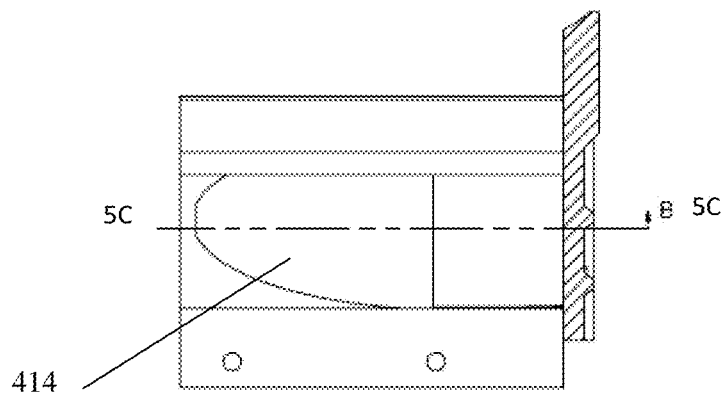
FIG. 5B is a perspective view of a portion of a basket taken along section line 5B-5B of FIG. 5A in accordance with one embodiment of the invention.
Figure 5C:
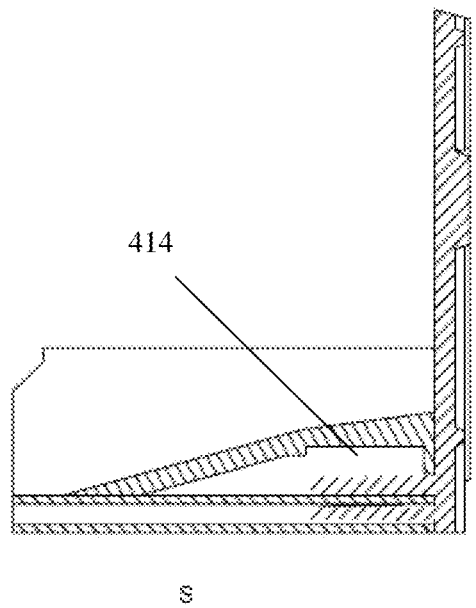
FIG. 5C is a side view of a portion of a basket along section line 5C-5C of FIG. 5B in accordance with one embodiment of the invention.

FIG. 4F shows a bucket 412 having a deflector 414. Deflector 414 may be positioned at either end of bucket 412. In some embodiments, a deflector 414 is positioned at both ends of bucket 412. The deflector 414 may be sized and shaped to prevent fish from being trapped in the corners and at the sides of bucket 412. Deflector 414 may guide fish to the center of bucket 412. FIG. 5A shows deflector 414 positioned on one end of a bucket 412 attached to basket frame 415.

Figure 5D:
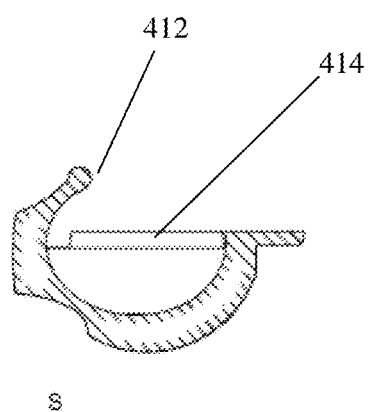
FIG. 5D is a side view of a portion of a basket along section line 5D-5D of FIG. 5A in accordance with one embodiment of the invention.

A side profile of the deflector 414 positioned within the bucket 412 is shown from a view of line 5B-5B. Line 5C-5C shows a side view of deflector 414. Deflector 414 is angled away from the end and toward the center of bucket 412. Deflector 414 is tapered to provide for a gradual angle toward the center. In some embodiments, the deflector taper may begin at an about 8° angle from horizontal for the first approximately 3.05 in. and taper to an about 15° angle for the balance. A side view of the bucket 412 with the deflector 414 as seen along Line 5D-5D is shown in FIG. 5D.

Figure 6A:
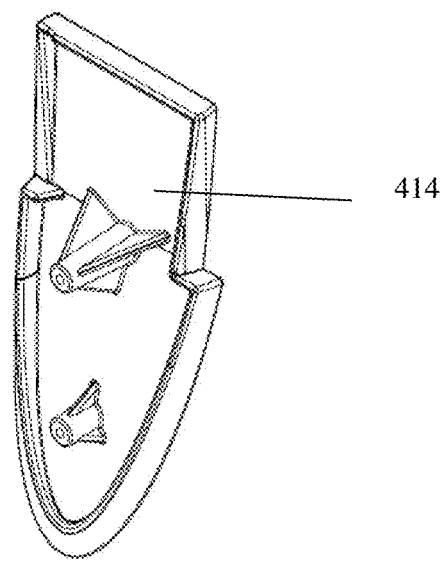
FIG. 6A is a bottom perspective view of a deflector in accordance with one embodiment of the invention.
Figure 6B:
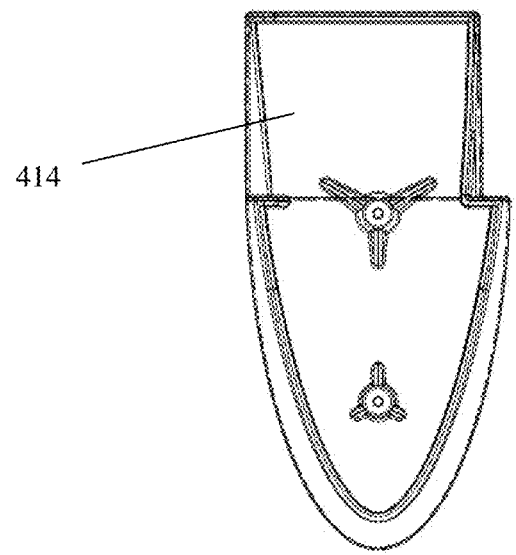
FIG. 6B is a bottom view of a deflector in accordance with one embodiment of the invention.
Figure 6C:
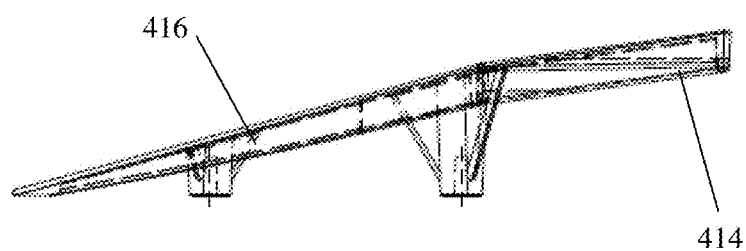
FIG. 6C is a side view of a deflector in accordance with one embodiment of the invention.

The configuration of deflector 414 is shown in various views in FIGS. 6A, 6B, and 6C. As previously discussed, deflector 414 is angled to guide fish toward the center of a bucket. Tapered section 416 may taper from an about 8° angle from the horizontal to an about 15° angle to the horizontal.

Figure 7:
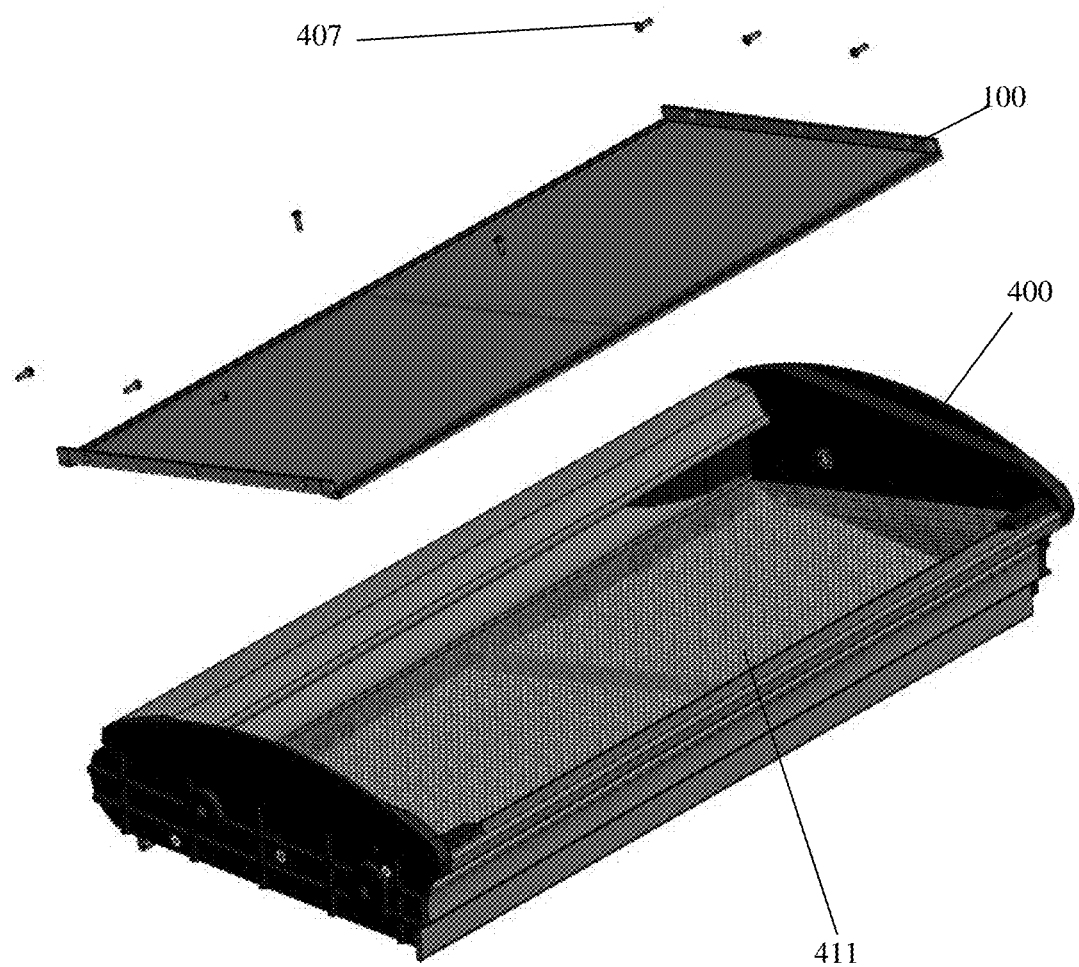
FIG. 7 is an exploded view of an assembly in accordance with one embodiment of the invention.
Figure 8:
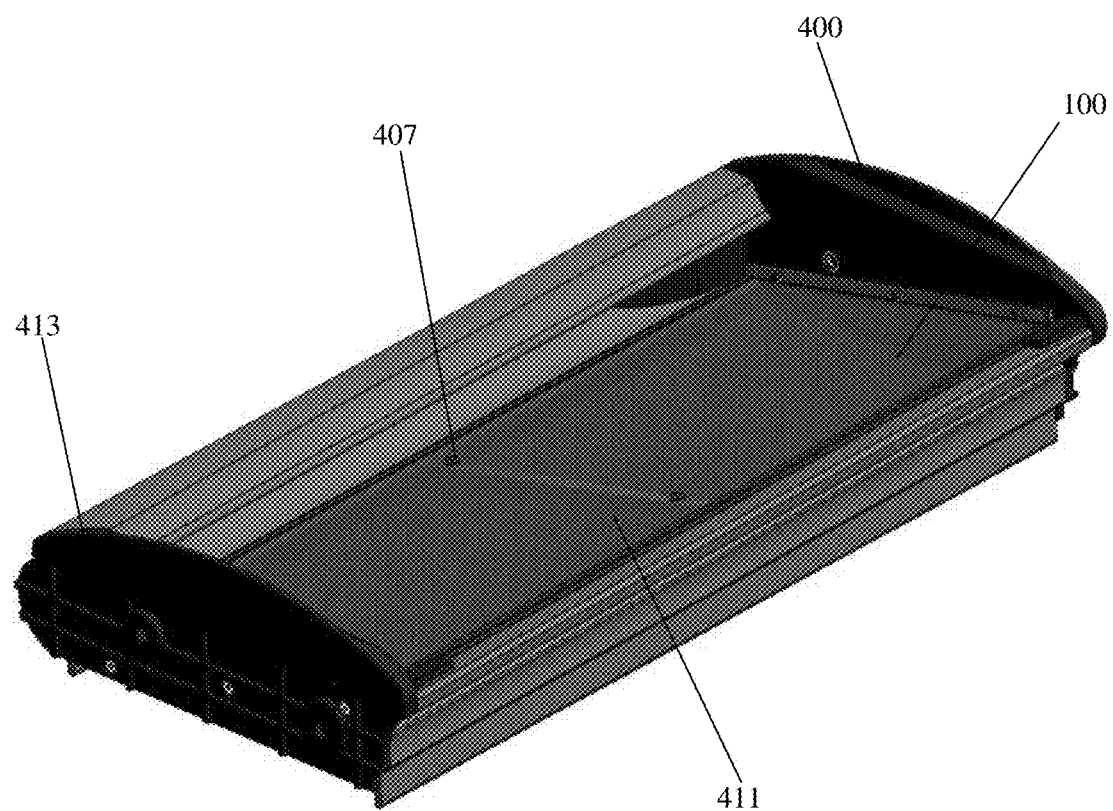
FIG. 8 is a schematic of an assembly in accordance with one embodiment of the invention.

An exploded view of basket 400 is shown in FIG. 7. A basket having a basket coarse mesh screen 411 attached to basket frame 413 is positioned behind a fine mesh overlay panel 100. Fine mesh overlay panel 100 may be attached to basket frame 413 by way of attachment means 407. Attachment means 407 may be any commonly available attachment means capable of withstanding the normal operating conditions of a traveling basket. For example, the means may be snaps, hooks, magnets, fasteners, or bolts. The assembled basket is shown in FIG. 8.

Figure 9C:
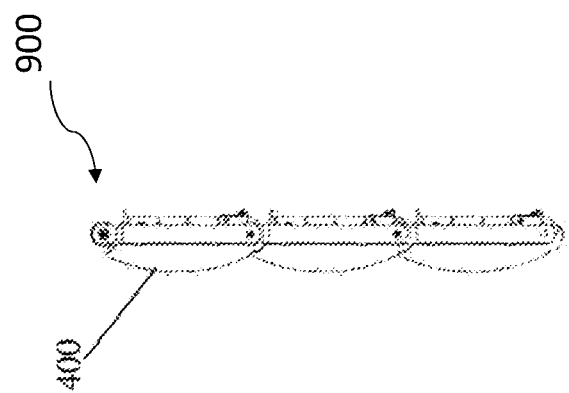
FIG. 9C is a side view of a portion of a system in accordance with one embodiment of the invention.
Figure 9B:
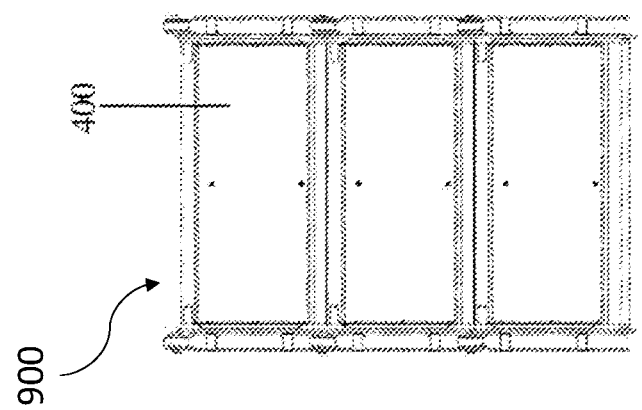
FIG. 9B is a front view of a portion of a system in accordance with one embodiment of the invention.
Figure 9A:
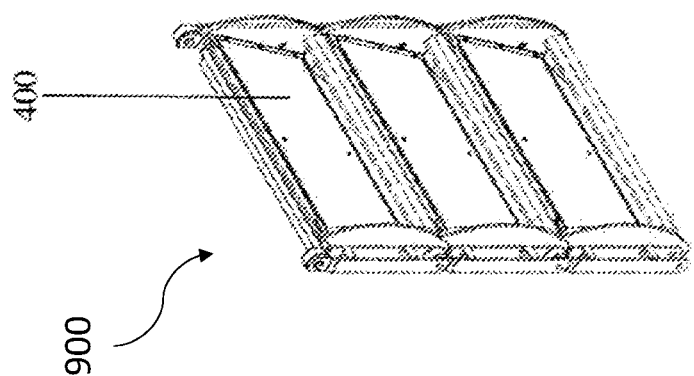
FIG. 9A is a front perspective view of a portion of a system in accordance with one embodiment of the invention.
Figure 10:
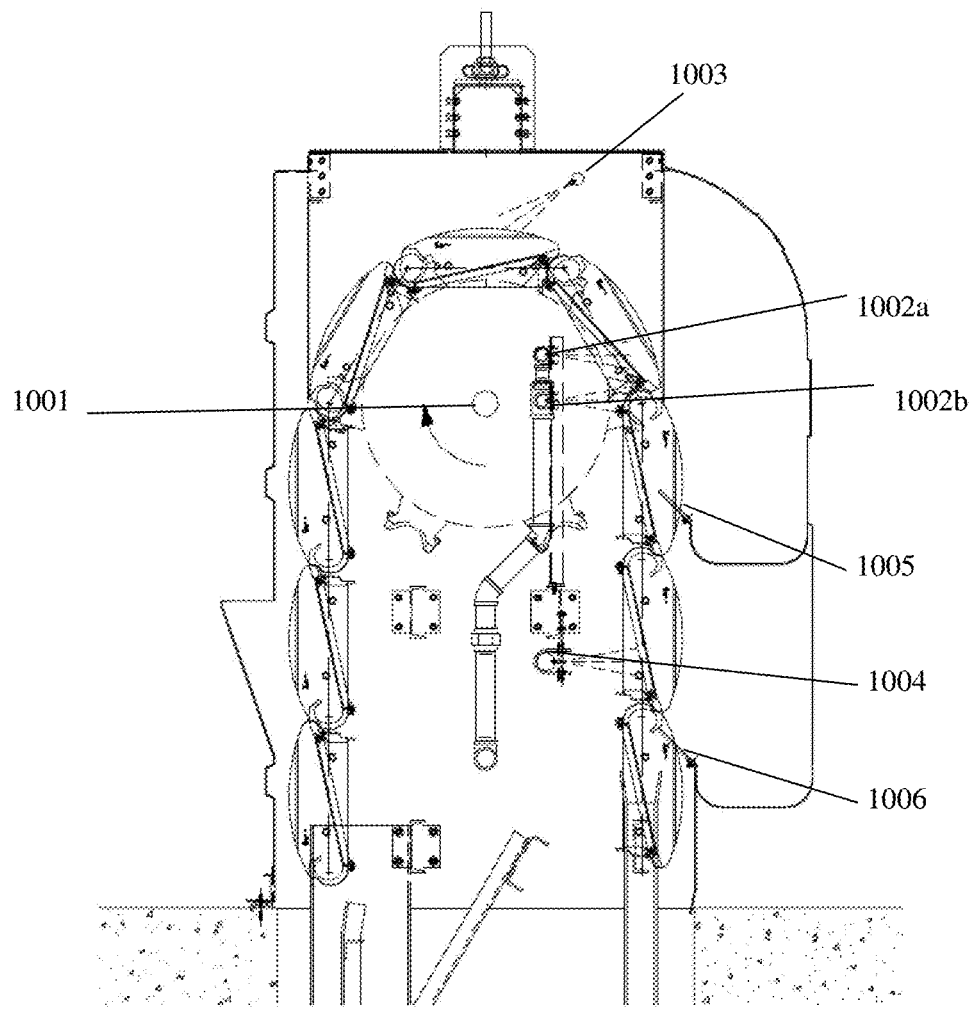
FIG. 10 is a schematic diagram of a partial head section interior of a traveling water screen.

FIGS. 9A, 9B, and 9C illustratively show various views of a traveling water screen 900. Traveling water screen 900 as shown illustrates only 3 adjacent baskets. A typical traveling water screen may have between about 12 and about 120 baskets. Traveling water screen 900 comprises a plurality of baskets in a vertical orientation. In some embodiments, the traveling water screen 900 may comprise a drive unit comprising a motor for moving the plurality of baskets along a path (FIG. 10). The drive unit may be mounted directly onto a headshaft 1001, or may use a drive unit mounted to the top of the head section transmitting torque to the headshaft through a drive chain and sprockets. In some embodiments, the traveling water screen 900 may comprise any common mechanical means for moving the plurality of baskets along a path. The traveling water screen 900 may comprise a sprocket and chain connected to the headshaft for movement of the baskets about a path. In some embodiments, the baskets move about a circuitous path.

The traveling water screen 900 may also comprise a water spray assembly. In some embodiments, traveling water screen 900 may comprise a water spray assembly having a low pressure fish header. In some embodiments, traveling water screen 900 may comprise a water spray assembly having an external spray header 1003 (FIG. 10). The external spray header 1003 may be directed at least a portion of the baskets. The external spray header 1003 may be located about 1 ft. 1⅜ in. from the vertical axis of a headshaft, and about 2 ft. 5⅛ in. to about 2 ft. 11 in. above the horizontal axis of the headshaft. The external spray header 1003 may spray water at an angle of approximately 16° to a screen in the traveling water screen. The external spray header may have a pressure of about 5 PSI to about 10 PSI. For example, the external spray header may have a pressure of about 7 PSI at the nozzle. The low pressure auxiliary fish header 1003 may be positioned and configured to wet the mesh screen and fish, and to clean out the bucket. External spray header 1003 may comprise at least one spray head. In some embodiments, external header 1003 may comprise a plurality of spray heads. The spray head may be any spray head capable of distributing a liquid. For example, the spray head may comprise spiral, cone, or fan spray heads. The spray angle of the spray head may be selected to optimize wetting of the mesh screens and fish. The spray heads may be all the same size, or may be of varying size. In some embodiments, the pipe supplying the spray heads with water from a source of water may comprise a filter to reduce plugging of the spray heads.

In some embodiments, traveling water screen 900 may comprise dual internal spray headers 1002a, 1002b. The dual internal spray headers may have a pressure of about 10 PSI to about 15 PSI. For example, the dual internal spray headers may have a pressure of about 15 PSI. The dual internal spray headers 1002a, 1002b may be positioned behind the plurality of baskets, and downstream of the intake water inlet. The dual internal spray headers 1002a and 1002b may be directed at the baskets. The dual internal spray headers 1002a, 1002b are configured to spray outward toward the baskets to assist fish in sliding down a screen and into a trough 1005 for removal from the intake stream. In some embodiments, each of the dual internal spray headers 1002a, 1002b operate at the same pressure. In other embodiments, each of the dual internal spray headers 1002a, 1002b operate at different pressures.

In some embodiments, dual internal spray headers 1002a, 1002b may comprise a plurality of spray heads. The spray head may be any spray head capable of distributing a liquid. For example, the spray head may comprise spiral, cone, or fan spray heads. The spray angle of the spray head may be selected to optimize wetting of the mesh screens and fish. The spray heads may be all the same size, or may be of varying size. In some embodiments, the pipe supplying the spray heads with water from a source of water may comprise a filter to reduce plugging of the spray heads.

The water spray assembly of traveling water screen 900 may also comprise a high pressure debris header 1004. The high pressure debris header may have a pressure of about 40 PSI to about 80 PSI, depending on the type of debris present. In some embodiments, the high pressure debris header may have a pressure of about 60 PSI to about 80 PSI. In some embodiments, the high pressure debris header may have a pressure of about 70 PSI to about 80 PSI. For example, the high pressure debris header may have a pressure of about 80 PSI. The high pressure debris header 1004 may be positioned behind the plurality of baskets, and downstream of the intake water inlet. The high pressure debris header 1004 may be configured to spray outward toward the baskets to assist in the removal of remaining organisms and debris from the basket. The debris may be deposited into a debris trough 1006 for removal from the intake stream.

In some embodiments, high pressure debris header 1004 may comprise a plurality of spray heads. The spray head may be any spray head capable of distributing a liquid. For example, the spray head may comprise spiral, cone, or fan spray heads. The spray angle of the spray head may be selected to optimize wetting of the mesh screens and fish. The spray heads may be all the same size, or may be of varying size. In some embodiments, the pipe supplying the spray heads with water from a source of water may comprise a filter to reduce plugging of the spray heads.

The pressure of each of the external spray header 1003, the dual internal spray headers 1002a, 1002b, and the high pressure debris header 1004 may be controlled or monitored. In some embodiments, separate controllers may control each of headers. In some embodiments, a controller is configured to control a rate of introduction of the spray water to be sufficient to remove fish from the bucket, and to remove debris from the mesh screen. The controller may be connected to at least one sensor positioned anywhere in the traveling water system. The sensor may transmit an input signal from a system variable to a controller, which may transmit an output signal to a valve or a pump fluidly connected to a source of water. In some embodiments, the variable may be at least one of system water demand, pressure drop, temperature, flowrate, water level or temporal season.

The controller used for monitoring and controlling operation of the water spray assembly may include a computerized control system. Various aspects of the invention may be implemented as specialized software executing in a general-purpose computer system. The computer system may include a processor connected to one or more memory devices, such as a disk drive, solid state memory, or other device for storing data. Memory is typically used for storing programs and data during operation of the computer system. Components of computer system may be coupled by an interconnection mechanism, which may include one or more busses (e.g., between components that are integrated within a same machine) and/or a network (e.g., between components that reside on separate discrete machines). The interconnection mechanism enables communications (e.g., data, instructions) to be exchanged between system components of system. The computer system also includes one or more input devices, for example, a keyboard, mouse, trackball, microphone, touch screen, and one or more output devices, for example, a printing device, display screen, and/or speaker.

The output devices may also comprise valves, pumps, or switches which may be utilized to introduce water from the source of water into the pipes supplying the spray heads with water. One or more sensors may also provide input to the computer system. These sensors may include, for example, intake stream flow rate, fish and/or debris level, and/or other sensors useful in a traveling water screen. These sensors may be located in any portion of a traveling water screen where they would be useful, for example, in an inlet or outlet stream of the traveling water screen. In addition, the computer system may contain one or more interfaces that connect the computer system to a communication network in addition or as an alternative to the interconnection mechanism.

The storage system typically includes a computer readable and writeable nonvolatile recording medium in which signals are stored that define a program to be executed by the processor or information to be processed by the program. The medium may include, for example, a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element, and aspects and embodiments disclosed herein are not limited thereto. Aspects and embodiments disclosed herein are not limited to a particular memory system or storage system.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Although the computer system is described by way of example as one type of computer system upon which various aspects and embodiments disclosed herein may be practiced, it should be appreciated that aspects and embodiments disclosed herein are not limited to being implemented on this computer system. Various aspects and embodiments disclosed herein may be practiced on one or more computers having a different architecture or components that this example.

The computer system may be a general-purpose computer system that is programmable using a high-level computer programming language. The computer system may be also implemented using specially programmed, special purpose hardware. In the computer system, the processor is typically a commercially available processor such as the well-known Pentium™ or Core™ class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C# (C-Sharp). Other object-oriented programming languages may also be used. Alternatively, functional, scripting, and/or logical programming languages may be used, for example ladder logic. Various aspects and embodiments disclosed herein are may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

EXAMPLES

A traveling water screen having a fine mesh overlay was optimized to safely and effectively collect and transfer entrainable-sized larvae to a fish return system. The traveling water screen with a fine mesh overlay reduces fish impingement mortality and was tested to meet the EPA's § 316(b) Rule.

A traditional traveling water screen having a 3/8" or 0.25"×0.5" coarse screen mesh collects and transfers inpingeable-sized organisms, but entrains smaller organisms, such as fish larvae. A fine mesh screen was overlaid onto a traditional traveling water screen.

The fine mesh screen was optimized to produce a target transfer efficiency of 80% or greater. The transfer efficiency of the screen was determined for its baseline operation configuration, and components were added to achieve the 80% efficiency.

In addition to the fine mesh screen, the traveling water screen was also equipped with a low-pressure fish spray wash system, which included two internal spray wash headers (15 psi) and one external header (7 psi). The internal headers were each equipped with five nozzles spaced 8.25 inches (21.0 cm) apart and offset from each other by 10 degrees. Each header was 10 inches (25.4 cm) from the back of the screen mesh and mounted seven inches off center of each other. The external spray wash header was equipped with six nozzles also with a 10 degrees offset from each other. The header was mounted approximately 34 inches (86.4 cm) up and 14 inches (35.6 cm) downstream from the center of the upper sprocket at a 34 degree angle from horizontal. In addition, a neoprene rubber flap seal and a simulated section of a return trough were installed on the downstream side of the screen. A single debris/fish trough will be used because height limitations within the test building prohibit the use of dedicated fish and debris troughs. The section of fish trough was slightly pitched, creating an "upstream" and "downstream" end which emptied into a collection tray equipped with overflow fine-mesh (350-μm mesh) barrier screening used to maintain water level and retain test organisms. With the exception of a debris trough section and debris spray wash, all the features of test screen were similar to screens that would be installed at a cooling water intake structure. This included the screen basket height, bucket depth and geometry, fish spray wash nozzle orientation, and the distance between the flap seal and screen face. As with the full-scale head loss measurement, evaluation the test screen was equipped with 0.25 ×0.5 inch backing mesh with the newly designed 1.0 mm fine-mesh overlay panels installed on all 12 screen panel baskets.

A known number of organisms were placed directly into the lifting buckets on the ascending side of the test screen to accurately determine the transfer efficiency. The baseline and optimization evaluations consisted of two replicates using Common carp (*Cyprinus carpio*) and Bluegill (*Lepomis macrochirus*) with 100 live organisms per species. The average length of the larvae tested during the baseline and optimization evaluation was 11.6 mm for Common carp and 17.6 mm for Bluegill. The baseline replicates were conducted under standard operating conditions for through-flow traveling water screens which included operating the two internal spray wash headers at 15 psi and the single external spray wash header at 7 psi with all nozzles in operation. At the start of each replicate test organisms were counted into groups of 100 and poured into a bucket on the ascending side of the stationary test screen. Once all organisms were in the bucket, the screen was rotated with the spray wash operational for 5 minutes, which was calculated to be two full screen rotations at the 12 ft./min (3.7 m/min) traveling speed. The spray wash and test screen was shut down and the fish trough rinsed with a gentle spray used to prevent larval adhesion to the sides of the trough and to concentrate the organisms into the collection tray at the termination of each replicate. Collected organisms were then sorted by species and enumerated to determine the number transferred for analysis.

A total of 38 Common carp and 48 Bluegill were successfully transferred to the fish collection trough during the two replicates under the baseline operational configuration. This resulted in a transfer efficiency of 19% for Common carp and 24% for Bluegill Table 1. The results of the baseline operational configuration were below the 80% target and therefore resulted in the need to optimize the traveling water screen components to increase the transfer efficiency.

TABLE 1

Baseline and Optimization Transfer Efficiency Results for Bluegill and Common carp

| Screen Component Configuration | Species | Number Released | Number Collected | Transfer Efficiency Percentage |
|---|---|---|---|---|
| Baseline | Bluegill | 200 | 48 | 24% |
| | Common carp | 200 | 38 | 19% |
| Optimization: Spray Wash Modifications | Bluegill | 200 | 124 | 62% |
| | Common carp | 200 | 166 | 83% |
| Optimization: Bucket Insert | Bluegill | 200 | 128 | 64% |
| | Common carp | 200 | 109 | 55% |
| Optimization: Combined | Bluegill | 200 | 196 | 98% |
| | Common carp | 200 | 189 | 95% |

It was decided that two methods of restricting the organisms to the center of the bucket would be evaluated independently and in combination to further investigate these observation. The first method included relocating the external spray wash header approximately 5 7/16" down, 3/4" closer to the screen face from the baseline location and adjusting it to a 16 degree angle to the screen face (34 degrees baseline). In addition to this relocation and angle modification, the four center nozzles were removed and plugged leaving only the two end nozzles operational on the spray header. With this modification of location and angle of the header it was expected that the spray wash would be more effective in washing the larvae to the center and out onto the screen face. The second method also incorporated the relocated spray wash header; however, all nozzles were operational and two 30 degree inclined foam inserts were inserted into the ends of the buckets. It was anticipated that these inserts would help keep larvae in the center of the bucket and prevent them from hanging up in the corners where removal by the spray wash could be more difficult.

As with baseline transfer efficiency evaluation two replicates of Common carp and Bluegill larvae (100 larvae each) were place directly into the lifting buckets on the ascending side of the test screen. The screen was rotated with the spray wash operational for two full rotations and the fish trough was rinsed down into the collection tray once the screen and spray wash was shut down at the end of each replicate. Collected organisms were again sorted by species and enumerated to determine the number transferred.

The spray wash-only optimization configuration resulted in a transfer efficiency of 83% for Common carp and 62% for Bluegill. The bucket insert-only optimization condition resulted in a transfer efficiency of 55% and 64%, respectively (Table 1). While alone each of these configurations resulted in a significant increase in transfer efficiency over the baseline evaluation it was only when evaluated in combination that the highest percent efficiency was observed; a combination optimization transfer efficiency of 95% for Common carp and 98% for Bluegill far exceeded the 80% target objective for this evaluation.

This evaluation demonstrated a successful optimization for transfer efficiency of the newly developed fine-mesh overlay panel system for two species of larval fish. This is an important initial step to the overall evaluation of this system, as collecting and transferring a sufficient number of organisms to the fish trough is necessary for a successful survival evaluation. Transfer efficiencies of 95% and 98% far exceeded the 80% target goal for this evaluation and demonstrate that this fine-mesh overlay system, when operated effectively, can collect and transfer a high number of post-yolk-sac sized larval organisms.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

The invention claimed is:

1. A traveling water screen, comprising:
 a basket comprising:
  a frame having an upper portion, a lower portion, and side portions;
  a coarse screen secured to the frame;
  a fine screen overlay removably attached to the coarse screen; and
  a bucket secured to the lower portion of the frame, the bucket extending in a longitudinal direction and comprising an inner wall surface and at least one deflector extending from the inner wall surface within and at a longitudinal end of the bucket, the at least one deflector angled away from the longitudinal end of the bucket and tapered downward towards a center of the bucket to divert fish, larvae, and debris away from the longitudinal end of the bucket to the center of the bucket.

2. The traveling water screen of claim 1, wherein the fine screen overlay is removably attached directly to the coarse screen.

3. The traveling water screen of claim 1, wherein the inner wall surface extends below the lower portion of the frame and creates a volumetric space.

4. The traveling water screen of claim 3, wherein the inner wall surface is concave.

5. The traveling water screen of claim 1, wherein the bucket extends below and across the entire lower portion.

6. The traveling water screen of claim 1, comprising at least two deflectors.

7. The traveling water screen of claim 6, wherein at least one of the deflectors is wedge-shaped.

8. The traveling water screen of claim 7, wherein the deflectors are positioned on opposite longitudinal ends of the bucket, each deflector having a bevel directed at the center of the bucket.

9. The traveling water screen of claim 1, further comprising a plurality of baskets.

10. The traveling water screen of claim 9, wherein each of the plurality of baskets is attached to an endless chain and is configured to move about a predetermined path.

11. The traveling water screen of claim 10, wherein the movement of the plurality of baskets is controlled by a movement control system.

12. The traveling water screen of claim 9, further comprising a spray head assembly in fluid communication with a source of water and directed at the baskets.

13. The traveling water screen of claim 12, wherein the spray head assembly comprises at least two spray heads.

14. The traveling water screen of claim 13, wherein at least one spray head is directed at a front portion of the basket.

15. The traveling water screen of claim 14, wherein the at least one spray head is configured to direct organisms to the center of the bucket.

16. The traveling water screen of claim 13, wherein at least one spray head is directed at a rear portion of the basket.

17. The traveling water screen of claim 16, wherein the at least one spray head is configured to remove debris from the basket.

18. The traveling water screen of claim 13, wherein the at least two spray heads have different pressures.

19. The traveling water screen of claim 13, wherein the flow rates of the spray heads are independently adjustable.

20. The traveling water screen of claim 12, further comprising a spray head assembly control system.

21. The traveling water screen of claim 20, wherein the spray head assembly control system comprises at least one sensor.

22. The traveling water screen of claim 21, wherein the at least one sensor provides an input signal to a controller, which provides an output signal to a pump fluidly connected to a source of water.

23. The traveling water screen of claim 22, wherein the input signal is based on a system variable.

24. The traveling water screen of claim 23, wherein the system variable comprises at least one of a system water demand, a pressure drop, a flowrate, temperature, a water level, or a temporal season.

25. The traveling water screen of claim 22, wherein the controller is further connected to a timer.

26. The traveling water screen of claim 12, wherein the spray head assembly comprises at least one internal spray head.

27. The traveling water screen of claim 12, where the spray head assembly comprises at least one external spray head.

28. The traveling water screen of claim 12, where the spray head assembly comprises a high pressure debris header.

* * * * *